March 29, 1966     H. F. MALONE     3,243,554

COMBINATION MOTOR PROTECTOR AND START RELAY

Filed Jan. 23, 1964     2 Sheets-Sheet 1

INVENTOR.
Homer F. Malone.
BY
Harness, Dickey & Pierce
ATTORNEYS

March 29, 1966  H. F. MALONE  3,243,554
COMBINATION MOTOR PROTECTOR AND START RELAY
Filed Jan. 23, 1964  2 Sheets-Sheet 2
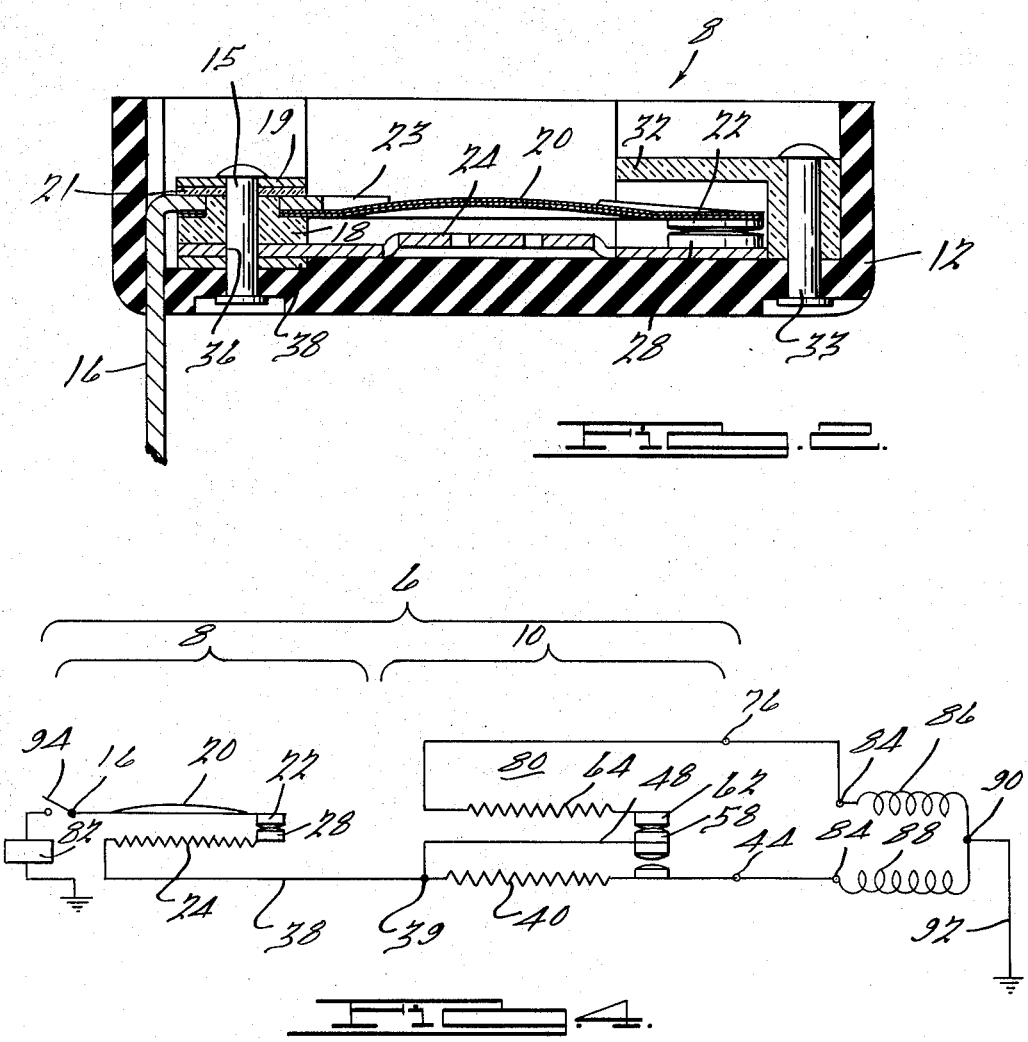
INVENTOR.
Homer F. Malone,
BY
Harness, Dickey & Pierce
ATTORNEYS.

United States Patent Office 3,243,554
Patented Mar. 29, 1966

3,243,554
COMBINATION MOTOR PROTECTOR AND START RELAY
Homer F. Malone, Jackson, Mich., assignor to Mechanical Products, Inc., Jackson, Mich., a corporation of Delaware
Filed Jan. 23, 1964, Ser. No. 339,687
1 Claim. (Cl. 200—122)

This invention relates generally to a combination motor protector and start relay and more particularly to a thermally operated start relay and motor protector combination.

A need has developed for an improved combination motor protector and start relay in applications where an electric motor runs, after energization, until stopped by the operation of a system control, for example, a pressure switch or temperature switch as utilized in refrigerator compressor motors, air conditioners, dehumidifiers, household water supply pumps, etc. In each of the aforementioned applications there is a delay in time before re-energization of the motor is practical without deleterious effects, which period of time permits the thermally responsive member, for example, a thermometal starting circuit blade, to reclose the start circuit. On the other hand, it is generally required that the starting circuit of the motor be opened in one second or less after line voltage is impressed on the motor. After voltage is removed by some circuit function, the start blade can be made to close the start circuit in readiness to restart the motor in, for example, thirty seconds or less.

Another requirement of a combination motor start relay and overload protector is that it be inherently mountable in close proximity to the motor assembly, preferably having the capability of being hermetically sealed withitn the compressor motor. Motor start relays and overload protectors heretofore known and used have been relatively massive requiring that the protector be mounted remote from the motor. This places the inherent limitation on the protector that overload protection be a function of current in the circuit incident to overload as opposed to environmental thermal conditions within the motor as when the protector is mounted in close proximity to the motor windings. It is of course desirable for the combination motor start relay and motor protector to receive and respond to heat from the motor as well as I²R losses incident to motor current. As a practical matter, it is often sufficient that the protector be mounted on the motor housing itself, thus enabling the protector to respond to the motor heat as well as the load current. The sole criterion as to inside or outside mounting is the size of the combination relay and protector in question. In either case, the relay and protector combination must be hermetically sealed.

The combination motor start relay and overload protector of the instant invention satisfies the foregoing requirements to a heretofore unknown degree in that it is also capable of mounting within the motor housing if so desired. The combination motor start relay and overload protector is responsive to motor heat as well as I²R losses thereby maximizing protection of the motor circuit.

Sensitivity of the start winding circuit is maximized by the use of heaters on both sides of a cantilever blade. One of the heaters responds to inrush current in the start winding and the other of the heaters to inrush current in the main winding.

The heat of both of the aforementioned heaters is effective, in conjunction with the I²R losses in the cantilever polymetallic blade itself, to cause the blade to open the start winding circuit very rapidly, in the order of approximately one second or less.

Running current in the heater of the main winding circuit then continues to produce radiant heat which causes the cantilever blade to maintain the start winding circuit in the open condition. The polymetallic blade is thus held in the open start winding condition until the connection to the source of electrical energy is broken by some external circuit condition such as a pressure or temperature responsive switch, mechanical switch or the like. On this disconnection of the energy source, the polymetallic blade is so biased by its own spring action to return to the closed start winding condition. This latter process involves a lapse of approximately thirty seconds, sufficient time to allow pressure in a compressor to reduce to zero or the like. Thus, the circuit has a built-in time delay before the circuit is ready for reenergization.

Also, in past motor protection and start relays, the protection portion of the system has been of a thermal nature and mounted in its own housing and the start relay has been of the magnetic type and it too has been mounted in its own housing. The instant invention has placed both units in a single small housing and provided thermal actuation for both the protector and the start relay. The advantages of the combined unit are, for example, compactness in size and durability in construction because of unitary fabrication, and reliability in use because the thermal characteristic is used to open start winding and does not rely on a drop in current to switch.

Accordingly, it is an object of the present invention to provide an improved combination thermally operated protector and relay for electrical circuit elements.

It is a further object of the present invention to provide a relay of the type described which has a fast response time in moving from its cold position to its heated position.

It is a further object of the present invention to provide a relay of the type described which has an inherent time delay in moving from its heated position to its cold position.

It is still a further object of the present invention to provide a combination protector and relay of the type described which is of such size as to be capable of being mounted within the housing of the electrical unit to be controlled.

It is still a further object of the present invention to provide a combination protector and relay of the type described which is of such construction as to be capable of being hermetically sealed with the electrical unit to be controlled.

Another object of the present invention is to provide a combination protector and relay of the type described which is capable of receiving and responding to heat generated within the electrical unit itself as well as current through the unit.

Another object of the present invention is to provide a combination protector and relay of the type described which is both a thermal protector and a thermal start winding switch for a motor.

Still another object of the present invention is to provide a combination protector and relay of the type described which is capable of being mounted in a single housing of small size.

Still another object of the present invention is to provide a combination protector and relay of the type described which is durable in construction, accurate in use, and reliable in operation.

Other objects, features and advantages of the present invention will become apparent from the subsequent description and the appended claims, taken in conjunction with the accompanying drawings, in which:

FIGURE 3 is a sectional view of the thermal relay portion of the combination taken along line 3—3 of FIGURE 1; and FIGURE 4 is a schematic diagram of an exemplification of the combination thermal protector and relay of FIGURE 1, namely a motor protection and start relay circuit.

Figure 1:
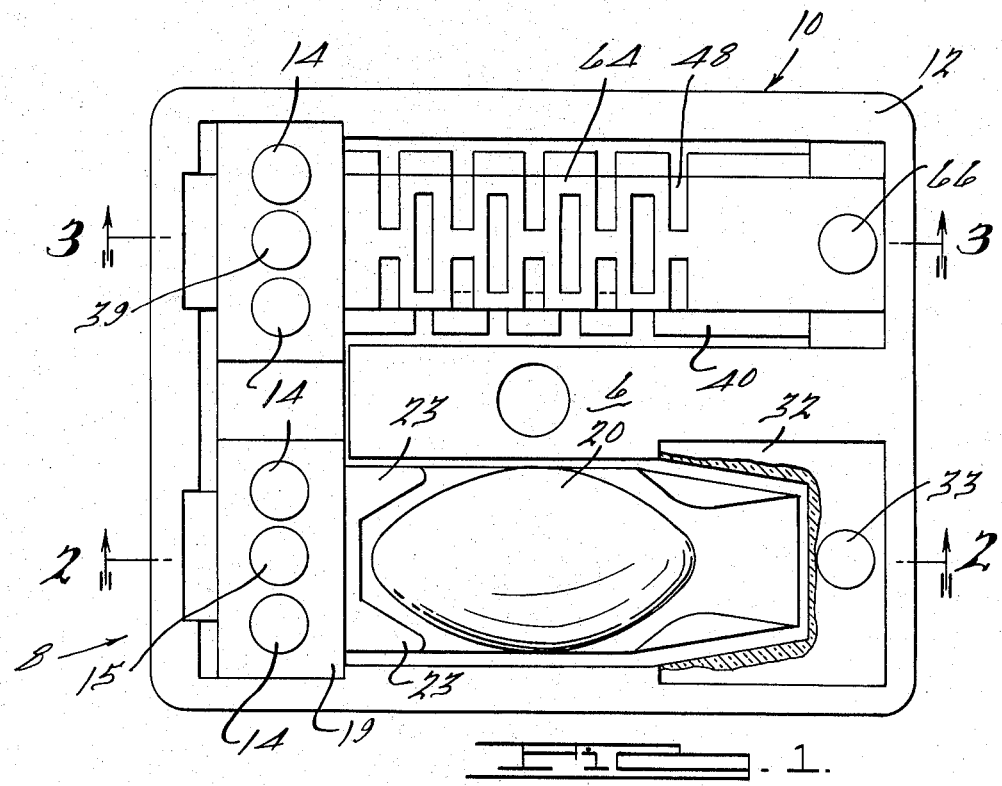
FIGURE 1 is a plan view of a combination thermal protector and relay embodying certain principles of the instant invention with an arc chamber partially broken away.
Figure 2:
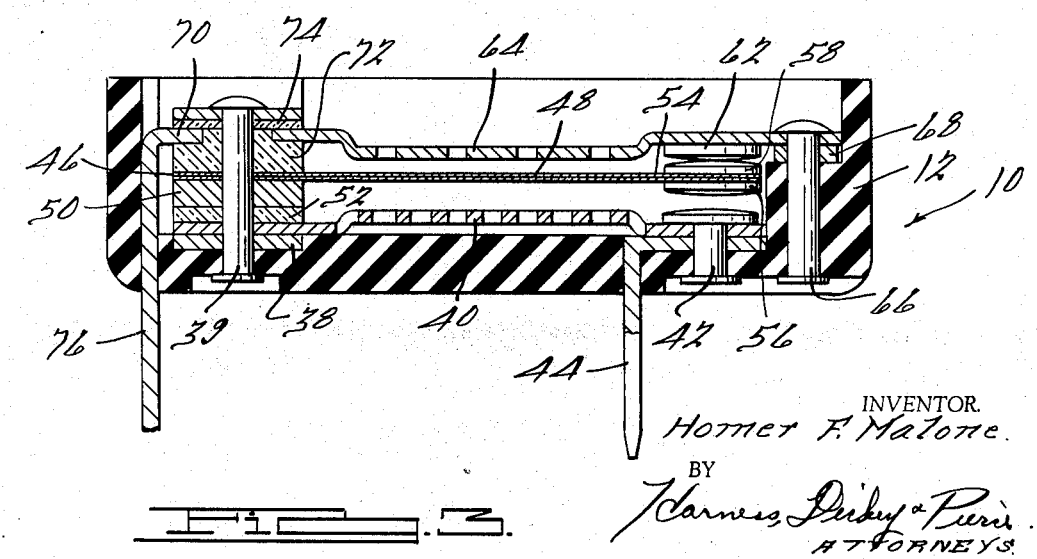
FIGURE 2 is a sectional view of the thermal protector portion of the combination taken along line 2—2 of FIGURE 1.

Referring now to FIGURES 1 to 3 of the drawing wherein there is illustrated a combination thermal protector and relay 6 consisting of two parts, a protector section 8 and a relay section 10. Both sections are suitably mounted in a casing or housing 12 by rivets 14 or like fastening means. The housing 12 is mounted on the electrical apparatus to be protected, such as an electric motor by means of a screw (not shown) inserted in an aperture formed in the casing 12 between the sections 8 and 10. It is to be understood that the combination protector and relay 6 may be mounted on the outer surface of the motor casing on the inside as the situation dictates. The protector section 8, the details of which are best illustrated in FIGURE 2, has an input terminal 16 which extends through houisng 12 to the interior thereof and is adapted to be connected to a suitable source of electrical energy (not shown). The terminal 16 is supported in housing 12 by means of rivet 15 and is spaced therefrom by means of a spacer member 18 which electrically insulates the terminal 16 from rivet 15. Rivet 15 is provided with a rivet plate 19 which provides a rigid seat for the head of the rivet. Insulating member 21 is interposed between plate 19 and terminal 16 to further insulate the terminal from the rivet.

Also mounted on spacer member 18 but in electrical contact with terminal 16, is a dished, polymetallic contact arm 20 which has a contact 22 mounted on the freely movable end thereof, as by welding or the like. The shape of the polymetallic arm is so devised as to provide a "snap" action at the freely movable end thereof upon a predetermined degree of heating of the arm as is known in the art. This "snap" action is further insured by a pair of ears 23 which are extensions of terminal element 16 and contact the flat portion of contact arm 20. Thus, the upward travel of the portion of the contact arm 20 immediately adjacent the fixed end portion of contact arm 20 is limited by ears 23 and the freely movable end will move only when the preselected temperature is reached. The degree of heating required is determined by the shape of the dished portion and the material used in the two metallic elements. The contact 22 may be constructed of any known material or materials, for example, a face portion of 85% silver and 15% cadmium oxide and a back portion of waffle faced "Monel" metal.

Mounted below the dished polymetallic arm 20 and in thermal association therewith, is a resistance conductor 24 of a high resistance material. Resistance conductor 24 is connected in series circuit with dished arm 20 by means of contact 22 and second contact 28 and, when energized, serves to generate heat in proportion to the load current flowing through the arm 20 and conductor 24. This generation of heat is sensed by the polymetallic arm 20. On an overload condition, the heat generated is enough to apply a sufficient force to deflect the polymetallic arm 20 to cause the freely movable end to "snap" away from the second contact 28 mounted on one end of the heater element 24. The resistance conductor 24 is fabricated of a ribbon of high resistacne material which has a generally serpentine configuration. This general shape allows a long current path to be placed in a confined location, thus allow a large quantity of heat to be generated.

Surrounding the contacts 22, 28 on four sides is an arc chamber 32 which is attached to casing 12 by a rivet 33 or other fastening means. The arc chamber is formed of a material which has arc quenching properties and is an electrical insulator. An example of such a material is alumina tri-hydroxide with a glass reinforcer sold under the tradename of "Rosite." In the presence of an arc this material has the property of giving off a vapor containing carbon dioxide and water, which has a cooling and quenching effect on the arc. In addition, the production of this vapor has a tendency to "blow" the arc due to the increased pressure in the chamber and thus stretch the arc out to increase the extinguishing characteristics of the arc chamber. The arc chamber also serves a further function in the case wherein the open end of the casing 12 is mounted on a metal portion of the unit to be controlled such as a motor or the like. In this situation, the "snap" action of the freely movable end may cause contact 22 to come into contact with the aforementioned metal portion. Thus, the arc chamber 32 limits the amount of travel of the freely movable end of polymetallic arm 20 and provides an insulating shield around the contacts 22, 28.

The other end of heater 24 is provided with an aperture 36 therein, which adapts the heater 24 to be mounted on the rivet 15 and in electrical contact with a conductor strip 38. This conductor strip 38 provides the electrical path between protector section 8 and relay section 10. Thus, the electrical path through the protector section 8 is from input terminal 16, through polymetallic contact arm 20, electrical contacts 22, 28, through resistance conductor 24 and out of the section by means of conductor strip 38.

Conductor strip 38 extends across casing 12 and into relay section 10, the details of which are best illustrated in FIGURE 3. The strip 38 is fixed to casing 12 by a rivet 39 in a manner similar to that illustrated in FIGURE 2. In electrical contact with strip 38 is a resistance heater 40, the other end of which is suitably mounted to casing 12 by a contact rivet 42. Also electrically connected to heater 40 is an output terminal 44 which provides one of two output terminals for relay section 10.

Connected to conductor strip 38 by rivet 39 is the fixed end 46 of a polymetallic arm 48. The arm 48 is physically spaced from resistance heater 40 by spacer washers 50, 52 but the electrical connection between these two elements is provided through rivet 39. It is to be understood that washers 50, 52 may be formed of a single member formed of a conductive substance to insure proper electrical contact between resistance heater 40 and arm 48 if the electrical path through rivet 39 is insufficient. The freely movable end 54 of arm 48 is provided with a pair of contacts 56, 58 which are similar in construction and method of fastening to contact 22 described above. The lower contact 56 is adapted to be moved into contact with contact rivet 42 by the thermal action of the contact arm 48 on supplying electrical energy to the heater 40 or polymetallic contact arm 48 or both.

When the unit is deenergized and the contact arm 48 is in the unheated state, the contact arm 48 is so biased as to urge the freely movable end 54 upwardly with the upper contact 58 in engagement with a fixed contact 62. The fixed contact 62 is mounted at one end of a second resistance heater 64 which is suitably fixed to the casing 12 by a rivet 66 and washer 68. The other end 70 of heater 64 is mounted on rivet 39 in a manner similar to the mounting of terminal 16 of FIGURE 2. In a like manner, heater 64 is electrically insulated from rivet 39 by a spacer member 72 and washer 74. Spacer member 72 also electrically insulates heater 64 from polymetallic contact arm 48. An extension of resistance heater 64 protrudes from casing 12 and provides the second output terminal 76 of relay section 10.

The following is a description of the operation of the relay section 10 when conductor strip 38 is energized through protector section 8 and terminals 44 and 76 are connected to electrical elements to be controlled such as the starting and running winding of a motor. The polymetallic contact arm 48 is cold and thus biased upwardly with contact 58 engaging contact 62. Thus, the electrical path through section 10 is from conductor strip 38, through resistance heater 40 and out through terminal 44 to the running winding of a motor. A second electrical path is established from conductor strip 38 through rivet 39, through polymetallic contact arm 48, contacts 58, 62 through resistance heater 64 and out terminal 76 to the starting winding of a motor which is to be controlled. With the two heaters 40, 64 disposed on either side of contact arm 48 and with the heating current flowing through all three elements 40, 48, 64, the contact arm 48 is rapidly (approximately 1 second) deflected downwardly due to the bimetal characteristics of the arm 48. Thus, the contact at contacts 58, 62 is broken and heater 64 and the starting winding are deenergized. However, the heating of contact arm 48 is sufficient to rapidly carry contact 56 into engagement with contact 42 where it remains due to the current flowing through both the contact arm 48 and resistance heater 40 in parallel. Thus, the main winding remains energized and the motor continues to run.

On either deenergizing of the combination protector and relay 6 by an external switch or the operation of protector section 8, the contact arm 48 starts to cool and commences its upward travel to the cool position under the action of its spring bias. This upward travel to the point where contact 58 engages contact 62 takes approximately 30 seconds to complete thus incorporating an inherent time delay in the relay before it is ready to reenergize the starting winding.

Referring now to FIGURE 4, there is illustrated therein a simple motor protection and start relay control circuit 80 which is particularly adapted to utilize the principles contained in the novel combination protector and relay described above. Connected to input terminal 16 of protector section 8 is one side of a source of electrical energy 82. The output terminals 76, 44 of relay section 10 are connected to the left terminals 84 of a starting winding 86 and a main winding 88, respectively, of an electric motor. The right terminals 90 of windings 86, 88 are connected to ground through conductor 92 which provides the return path to source 82. On closing of a switch 94, current flows from source 80 to enter protector section 8 and flows through "snap" bimetal 20, contacts 22, 28 through resistance heater 24 and conductive strip 38. The current then enters relay section 10 and flows through the parallel paths consisting of resistive heater 40, terminal 44 and main motor winding 88 to ground, and polymetallic contact arm 48, resistance heater 64, output terminal 76, starting winding 86 to ground.

Due to the disposition of heaters 64 and 40 above and below polymetallic arm 48, respectively, a great amount of heat will be generated due to the inrush of current in starting windings 86 and running or main windings 88. This large current will cause the arm 48 to deflect downwardly very rapidly, in the order of one second. Thus, the starting winding will be connected in circuit for a period sufficient to start the motor but no longer. When switch 94 is opened or overload protection switch 20 is activated, the source is disconnected from all heaters and the polymetallic elements 20, 48 begin to cool. As soon as element 20 reaches its "snap" back position, the contacts 22, 28 are again closed. Also, arm 48 begins its travel to the closed position shown in the circuit diagram, i.e., with contacts 58, 62 closed. However, the properties of the metal used in contact arm 48 and its configuration are of such a nature that heat is dissipated slowly and the time for contact 58 to travel from the open position to the position in engagement with contact 62 takes approximately thirty seconds.

This time delay is an important feature in the case where a compression motor or the like is being controlled. In this situation, it is harmful to the various units involved to restart the compressor motor before the back pressure has had time to dissipate. This dissipation of the pressure involves a period of time of approximately thirty seconds and this is the time required for contact 58 to be in position to reenergize starting windings 86.

There are other situations in which the combination motor protector and start relay may be used where it is desired that the start circuit be reenergized as rapidly as possible. The operation of the instant motor protector and start relay is sufficiently fast or may be made to be sufficiently fast by redesigning of the bimetal configuration for greater heat dissipation to make the combination unit satisfactory for all situations in which it may be used.

While it will be apparent that the preferred embodiments of the invention disclosed are well calculated to fulfill the objects above stated, it will be appreciated that the invention is susceptible to modification, variation and change without departing from the proper scope or fair meaning of the subjoined claim.

What is claimed is:

A combination motor protector and start relay for an electrical motor comprising: an insulating housing, first, second and third terminals extending exteriorly of said base members, a generally flat snap acting bimetallic blade electrically connected to said first terminal, said blade having a fixed end supported by said housing and a freely movable end, a first electrical contact supported by the free end of said blade, a second electrical contact engageable with said first contact, a first substantially flat heater having one end electrically connected to said second contact and extending in closely spaced generally parallel relation to said blade, a second substantially flat bimetallic blade electrically connected to the other end of said first heater, said second blade having third and fourth contacts on opposite sides of one end thereof electrically engageable with fifth and sixth contacts, respectively, a substantially flat second heater electrically connected to said fifth contact and to said second terminal, said second heater extending in closely spaced generally parallel relation to said second blade on one side thereof, said third and fifth contacts being normally biased to the closed condition by said second blade, a substantially flat third heater electrically connected to the other end of said first heater and to said sixth contact, said sixth contact being connected to said third terminal, said third heater extending in closely spaced generally parallel relation to said second blade on the opposite side thereof from said second heater whereby said second blade is initially heated by said second and third heaters to rapidly effect opening of said third and fifth contacts and closure of said fourth and sixth contacts thereby deenergizing said second heater and shunting said third heater.

References Cited by the Examiner

UNITED STATES PATENTS

| 2,231,463 | 2/1941 | Dehlendorf | 200—122 |
| 2,352,984 | 7/1944 | Walle | 200—149 |
| 2,876,311 | 3/1959 | Ellenberger | 200—122 |
| 3,004,203 | 10/1961 | Epstein | 200—122 |

BERNARD A. GILHEANY, *Primary Examiner.*

L. A. WRIGHT, *Assistant Examiner.*